(12) United States Patent
Nakamura

(10) Patent No.: US 7,561,355 B2
(45) Date of Patent: Jul. 14, 2009

(54) OPTICAL LENS UNIT INCLUDING LENS BARREL CONTAINING LENS AND METHOD FOR PRODUCING OPTICAL LENS UNIT

(75) Inventor: Hidetoshi Nakamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/952,070

(22) Filed: Dec. 6, 2007

(65) Prior Publication Data
US 2008/0165438 A1    Jul. 10, 2008

(30) Foreign Application Priority Data
Jan. 9, 2007  (JP) ............................ 2007-001032

(51) Int. Cl.
*G02B 7/02* (2006.01)
(52) U.S. Cl. ....................................... 359/819; 359/811
(58) Field of Classification Search .................. 359/819
See application file for complete search history.

(56) References Cited
U.S. PATENT DOCUMENTS

| | | | |
|---|---|---|---|
| 6,567,224 B2 | 5/2003 | Hatakeyama et al. | |
| 6,935,136 B2 | 8/2005 | Otsuki et al. | |
| 2001/0053032 A1* | 12/2001 | Hatakeyama et al. | ........ 359/819 |
| 2005/0152050 A1* | 7/2005 | Noda et al. | .................. 359/819 |
| 2006/0092531 A1* | 5/2006 | Hatakeyama et al. | ........ 359/811 |

* cited by examiner

*Primary Examiner*—Jordan M. Schwartz
*Assistant Examiner*—James C Jones
(74) *Attorney, Agent, or Firm*—Beyer Law Group LLP

(57) ABSTRACT

A method for producing an optical lens unit, the optical lens unit including a lens and a metallic lens barrel that holds the lens therein, includes forming the lens barrel so as to be a hollow cylinder and so as to have an inclined surface, formed on the inner wall of the lens barrel, extending from a position adjacent to a first opening to a position adjacent to a second opening and being tilted at a tilting angle ranging from 10° to 20°; and placing a spherical lens base on the inclined surface formed on the inner wall of the lens barrel, heating the lens base in this state such that the lens base is bonded to the inner wall of the lens barrel by pressure, heating the lens base again, and shaping lens surfaces adjacent to the openings of the lens barrel.

4 Claims, 3 Drawing Sheets

OPTICAL LENS UNIT INCLUDING LENS BARREL CONTAINING LENS AND METHOD FOR PRODUCING OPTICAL LENS UNIT

CLAIM OF PRIORITY

This application claims benefit of the Japanese Patent Application No. 2007-001032 filed on Jan. 9, 2007, which is hereby incorporated by reference.

BACKGROUND OF THE INVENTION

1. Field of the Invention

The present invention relates to optical lens units including lens barrels that contain lenses and methods for producing the optical lens units, and in particular, relates to optical lens units having lens surfaces shaped by heating glass bulbs in lens barrels and methods for producing the optical lens units.

2. Description of the Related Art

Typical optical lens units including glass lenses held inside metallic lens barrels are formed by placing glass bulbs serving as lens bases inside the lens barrels, heating the glass bulbs until the glass bulbs are softened, and deforming the glass bulbs by vertical clamping using molds such that the glass bulbs are bonded to the insides of the lens barrels by pressure and such that lens surfaces are formed in optical-axis directions of the lens barrels by transferring the shapes of the mold surfaces to the lens bases. Japanese Unexamined Patent Application Publication No. 2002-6189, for example, describes an optical lens unit produced in this manner.

FIG. 5 is a cross-sectional view illustrating a production process of a known optical lens unit. In FIG. 5, a glass bulb 55 is disposed inside a lens barrel 50. As shown in FIG. 5, the lens barrel 50 is hollow, and has an inner wall 51. The lens barrel 50 has an inclined surface 54 formed on the inner wall 51 between a first opening 52 and a second opening 53. With this, the diameter of the second opening 53 is smaller than that of the first opening 52. The tilting angle θ of the inclined surface 54 formed on the inner wall 51 of the lens barrel 50 ranges from 40° to 70°, and the glass bulb 55 is disposed so as to be brought into contact with an end of the inclined surface 54 adjacent to the second opening 53.

The glass bulb 55 is often preheated in the state shown in FIG. 5 in order to remove impurities on the surface thereof before the lens surfaces are shaped. In this case, the end of the inclined surface 54 adjacent to the second opening 53 digs into the glass bulb 55 that is slightly softened by heating, and a groove 56 is formed. When the glass bulb 55 is rotated while the lens barrel is carried to a forming press after preheating or by vibration during press-forming, the groove 56 formed during preheating can be located at positions where the lens surfaces are to be formed as shown in FIG. 6. In this case, the groove remains as an imprint after the lens surfaces are shaped, and the optical lens unit is rejected.

SUMMARY OF THE INVENTION

The present invention provides an optical lens unit capable of preventing product failure even when a glass bulb is preheated and a method for producing the optical lens unit.

An optical lens unit according to an aspect of the present invention includes a lens and a metallic lens barrel that holds the lens therein. The lens barrel is a hollow cylinder, and has an inclined surface, formed on the inner wall of the lens barrel, extending from a position adjacent to a first opening to a position adjacent to a second opening and being tilted at a tilting angle ranging from 10° to 20° so as to hold the lens. With this structure, a lens base can be held on the inclined surface during shaping of the lens base, and the rotation of the lens base after preheating can be prevented. As a result, product failure can be prevented.

A method for producing an optical lens unit according to another aspect of the present invention, the optical lens unit including a lens and a metallic lens barrel that holds the lens therein, includes forming the lens barrel so as to be a hollow cylinder and so as to have an inclined surface, formed on the inner wall of the lens barrel, extending from a position adjacent to a first opening to a position adjacent to a second opening and being tilted at a tilting angle ranging from 10° to 20°; and placing a spherical lens base on the inclined surface formed on the inner wall of the lens barrel, heating the lens base in this state such that the lens base is bonded to the inner wall of the lens barrel by pressure, heating the lens base again, and shaping lens surfaces adjacent to the openings of the lens barrel. In this method, the lens base can be fixed to the lens barrel by preheating, and the rotation of the lens base after preheating can be prevented. As a result, product failure can be prevented.

DESCRIPTION OF THE PREFERRED EMBODIMENTS

Figure 1:
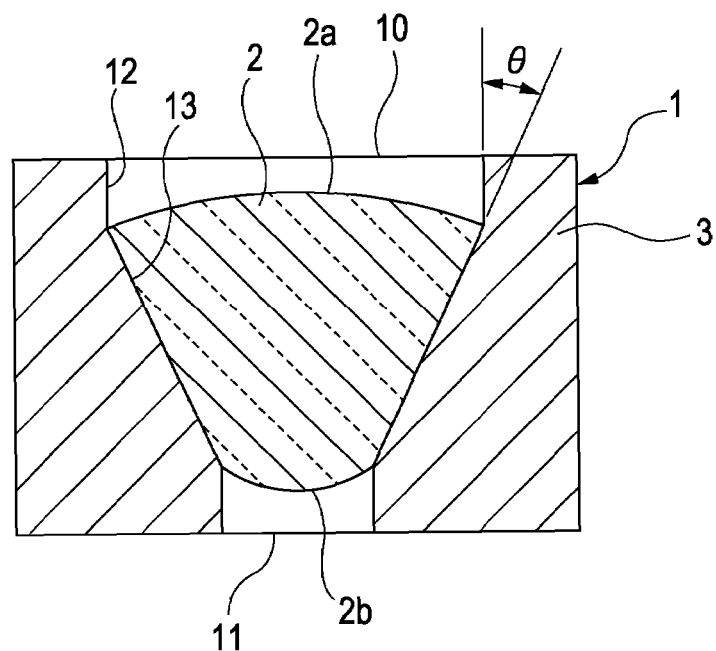
FIG. 1 is a cross-sectional view of an optical lens unit according to an embodiment of the present invention.

Embodiments of the present invention will now be described with reference to the drawings. FIG. 1 is a cross-sectional view of an optical lens unit according to an embodiment. As shown in FIG. 1, an optical lens unit 1 in this embodiment includes a glass lens 2 and a metallic lens barrel 3 in which the lens 2 is held. The lens barrel 3 is composed of, for example, ferrite-based stainless steel, and the lens 2 is composed of an optical glass material such as lead-oxide-based glass.

As shown in FIG. 1, the lens barrel 3 is cylindrical, and has an inner wall 12 in which the lens 2 is accommodated. The inner wall 12 has an inclined surface 13 at an intermediate position thereof such that the diameter of a first opening 10 becomes larger than that of a second opening 11. The inclined surface 13 extends from a position adjacent to the first opening 10 to a position adjacent to the second opening 11, and is inclined by a tilting angle θ ranging from 10° to 20°.

The lens 2 has a first lens surface 2a exposed via the first opening 10 of the lens barrel 3 and a second lens surface 2b exposed via the second opening 11 of the lens barrel 3. The diameter of the second lens surface 2b is smaller than that of the first lens surface 2a due to the shape of the lens barrel 3. In this embodiment, both surfaces of the lens 2 are convex. However, the present invention is not limited to this, and both surfaces can be concave.

Figure 2:
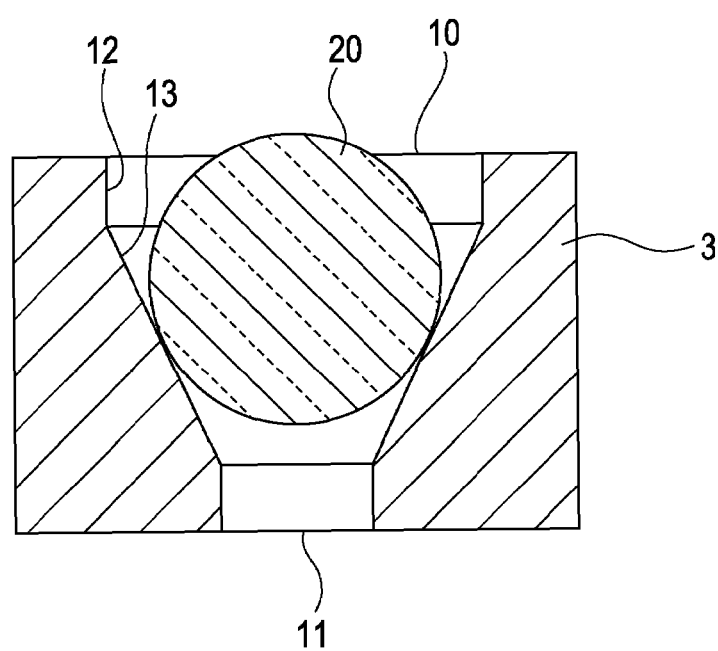
FIG. 2 is a cross-sectional view illustrating a production process of the optical lens unit including a glass bulb disposed inside a lens barrel.

Next, a method for producing the optical lens unit 1 according to the above-described embodiment will be described. The lens barrel 3 is cut so as to have the inclined surface 13 in advance. Moreover, a spherical glass bulb 20 serving as a lens base is prepared in advance. FIG. 2 is a cross-sectional view illustrating a production process of the optical lens unit 1 including the glass bulb 20 disposed inside the lens barrel 3.

As shown in FIG. 2, the glass bulb 20 is brought into contact with and held by the inclined surface 13 at a predetermined position of the inclined surface 13 away from the ends of the inclined surface 13 when the glass bulb 20 is fitted into a space formed by the inner wall 12 of the lens barrel 3. The glass bulb 20 is not brought into contact with the ends of the inclined surface 13 of the lens barrel 3 since the inclined surface 13 extends from a position adjacent to the first opening 10 to a position adjacent to the second opening 11 and the tilting angle thereof ranges from 10° to 20°.

The glass bulb 20 is preheated in this state. Heating members are disposed around the lens barrel 3 in which the glass bulb 20 is disposed so as to heat the lens barrel 3 and the glass bulb 20. The heating members heat the glass bulb 20 until the surface thereof is slightly softened. With this, impurities adhered to the surface of the glass bulb 20 can be removed.

During preheating, the inner diameter of the lens barrel 3 is slightly increased by thermal expansion, and the glass bulb 20 is moved downward by the weight thereof in response to the expansion of the inner diameter of the lens barrel 3 while the surface of the glass bulb 20 is slightly softened. After preheating, the inner diameter of the lens barrel 3 recovers to its original value, and the surface of the glass bulb 20 is also hardened again. Since the glass bulb 20 is moved downward in response to the expansion of the inner diameter of the lens barrel 3, the glass bulb 20 is pressed by the inclined surface 13 of the lens barrel 3 when the inner diameter of the lens barrel 3 recovers to its original value, and is bonded to the inclined surface 13 of the lens barrel 3 by pressure when the surface of the glass bulb 20 is hardened.

Figure 3:
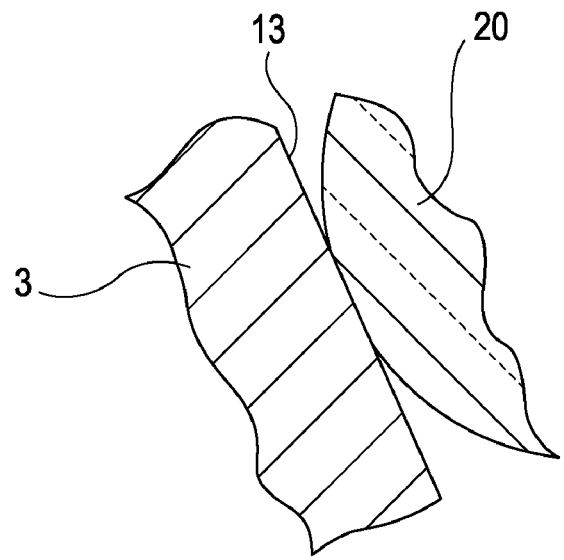
FIG. 3 is a partially enlarged view of a portion at which the lens barrel and the glass bulb are in contact with each other after preheating in the state shown in FIG. 2.

FIG. 3 is a partially enlarged view of a portion at which the lens barrel 3 and the glass bulb 20 are in contact with each other after preheating in the state shown in FIG. 2. In FIG. 3, the glass bulb 20 bonded by pressure is shown in a slightly exaggerated manner. As shown in FIG. 3, the glass bulb 20 is deformed and diffusion-bonded to the inclined surface 13 at the portion where the glass bulb 20 and the inclined surface 13 are in contact with each other, and the entire circumference of the glass bulb 20 is pressed inward by the lens barrel 3.

In order to bond the glass bulb 20 to the lens barrel 3 by pressure, the glass bulb 20 needs to be in contact with the inclined surface 13 at the predetermined position of the inclined surface 13 on the inner wall 12 of the lens barrel 3 away from the ends of the inclined surface 13 during preheating. In this embodiment, the glass bulb 20 can be reliably disposed at the predetermined position of the inclined surface 13 away from the ends of the inclined surface 13 since the inclined surface 13 extends from a position adjacent to the first opening 10 to a position adjacent to the second opening 11 and the tilting angle thereof ranges from 10° to 20°.

Furthermore, the bonding between the glass bulb 20 and the lens barrel 3 by pressure is affected by parameters such as degree of crimping effect caused by the weight of the glass bulb 20 and the difference between the coefficients of linear expansion of the materials of the lens barrel 3 and the glass bulb 20, degree of softening of the glass bulb 20, and roughness of grooves cut on the inner wall 12 of the lens barrel 3. Thus, these parameters need to be appropriately set.

Lens surfaces are shaped after preheating. In order to shape the lens surfaces, the glass bulb 20 is heated again until the glass bulb 20 is softened. The glass bulb 20 is heated in the same manner as in preheating, that is, the lens barrel 3 is heated such that the glass bulb 20 is heated and softened.

Figure 4:
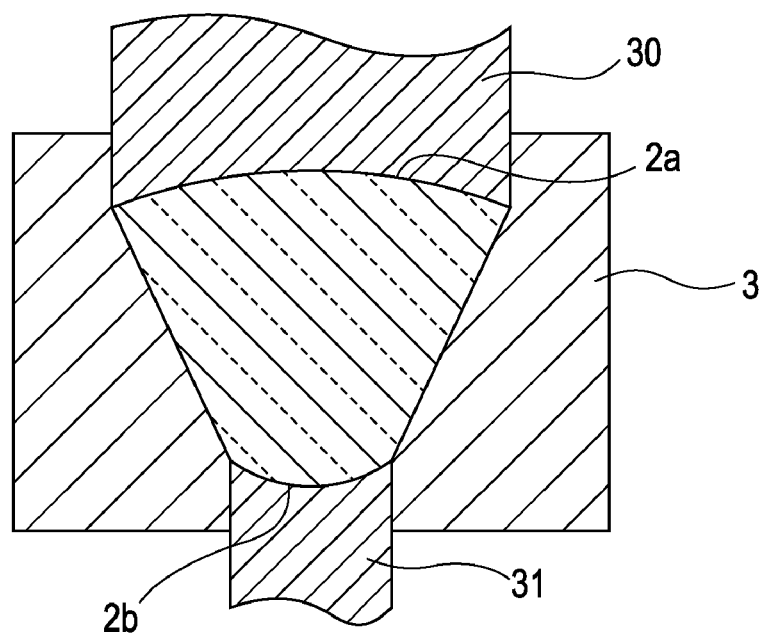
FIG. 4 is a cross-sectional view illustrating a press-forming process during the production of the optical lens unit.
Figure 5:
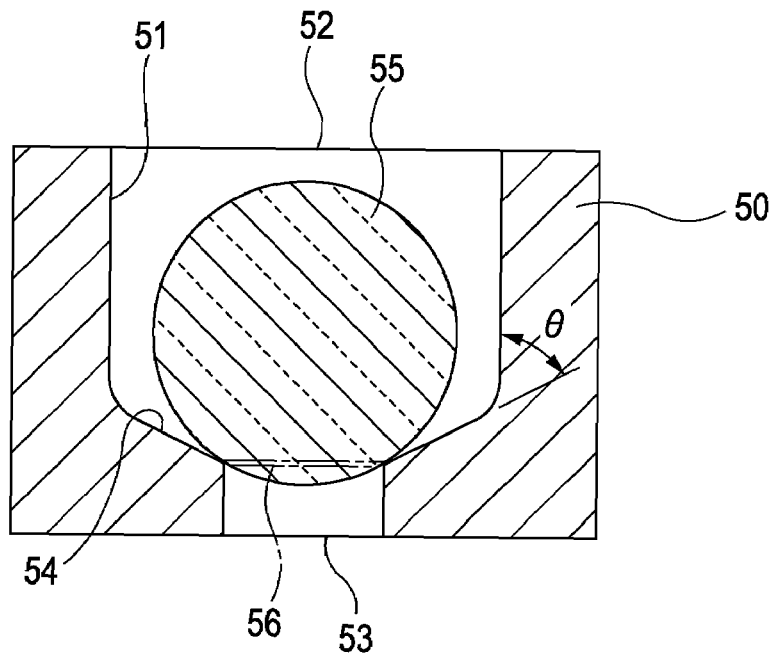
FIG. 5 is a cross-sectional view illustrating a preheating process during the production of a known optical lens unit including a glass bulb disposed inside a lens barrel.
Figure 6:
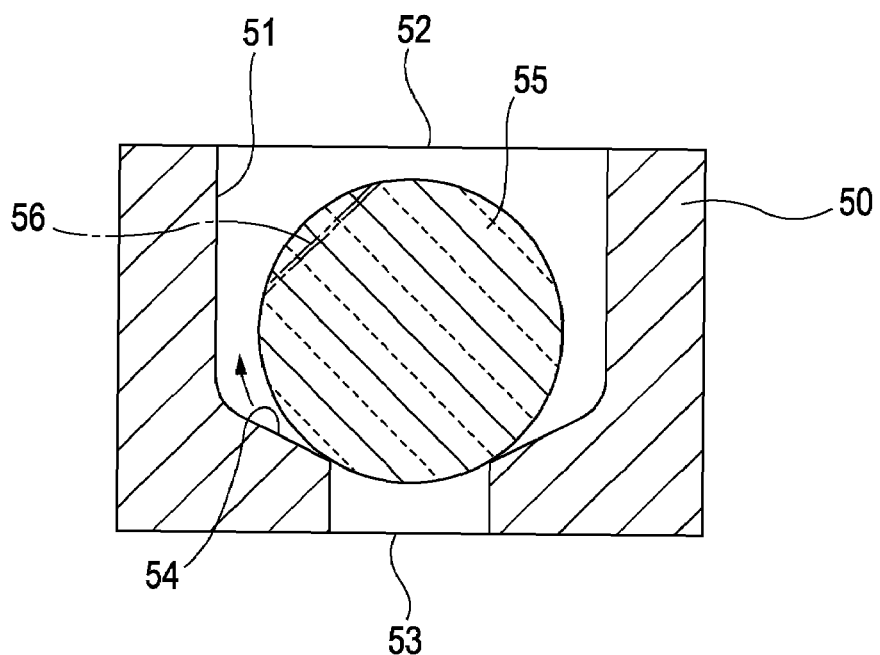
FIG. 6 is a cross-sectional view illustrating a state where the glass bulb is rotated from the position shown in FIG. 5.

When the glass bulb 20 is softened, an upper mold 30 and a lower mold 31 are inserted from the openings 10 and 11, respectively, of the lens barrel 3 as shown in FIG. 4 and press the glass bulb 20. With this, the glass bulb 20 is deformed by pressure, and the shapes of the mold surfaces are transferred to the glass bulb 20. In this manner, the first lens surface 2a and the second lens surface 2b are formed.

Since the glass bulb 20 is bonded to the lens barrel 3 by pressure during preheating as described above, the portion of the glass bulb 20 at which the glass bulb 20 is in contact with the lens barrel 3 is not exposed via the openings, and is not formed into the lens surfaces during press-forming. Thus, product failure caused by exposure of the contact portion can be prevented.

Embodiments of the present invention have been described above. However, the present invention is not limited to these, and various modifications are possible within the technical scope of the invention.

What is claimed is:

1. An optical lens unit comprising:
a lens; and
a metallic lens barrel that holds the lens therein, wherein the lens barrel is a hollow cylinder having a first opening, a second opening, and an inner wall formed from the first opening to the second opening, the inner wall including:
a first cylindrical surface extending from the first opening to a first position adjacent to the first opening;
an inclined surface extending from the first position to a second position adjacent to the second opening; and
a second cylindrical surface extending from the second position to the second opening,
and wherein the inclined surface has a constant tilting angle from the first position to the second position so as to hold the lens, the constant tilting angle being within a range from 10° to 20°.

2. A method for producing an optical lens unit, the optical lens unit including a lens and a metallic lens barrel that holds the lens therein, said method comprising:
forming the lens barrel in a form of a hollow cylinder having a first opening, a second opening, and an inner wall formed from the first opening to the second opening, the inner wall including: a first cylindrical surface extending from the first opening to a first position adjacent to the first opening; an inclined surface extending from the first position adjacent to the first opening to a second position adjacent to the second opening; and a second cylindrical surface extending from the second position to the second opening, the inclined surface having a constant tilting angle from the first position to the second position, the constant tilting angle being within a range from 10° to 20°;
placing a spherical lens base on the inclined surface formed on the inner wall of the lens barrel such that the lens base is not brought into contact with the second position which is an end of the inclined surface;
preheating the lens base in the placed position such that the lens base is bonded to the inner wall of the lens barrel by pressure;
heating the lens base again; and
shaping lens surfaces adjacent to the openings of the lens barrel.

3. The method of claim 2, wherein said preheating includes:
softening a surface of the lens base and expanding a diameter of the inclined surface such that the lens base moves downward by a weight thereof along the inclined surface.

4. The method of claim 2, wherein the lens base is bonded to the inner wall of the lens barrel by the pressure from the inclined surface that is recovering the original diameter after thermal expansion.

* * * * *